(12) United States Patent
Lee

(10) Patent No.: US 11,968,061 B2
(45) Date of Patent: Apr. 23, 2024

(54) POWER MANAGEMENT SYSTEM HAVING GATEWAY ENGINE AND DRIVING METHOD THEREOF

(71) Applicant: Bigtorage CO., LTD., Daejeon (KR)

(72) Inventor: Cheol Hee Lee, Sejong-si (KR)

(73) Assignee: Bigtorage CO., LTD., Daejeon (KR)

( * ) Notice: Subject to any disclaimer, the term of this patent is extended or adjusted under 35 U.S.C. 154(b) by 0 days.

(21) Appl. No.: 18/346,844

(22) Filed: Jul. 4, 2023

(65) Prior Publication Data
US 2024/0015048 A1    Jan. 11, 2024

(30) Foreign Application Priority Data
Jul. 6, 2022    (KR) .......................... 10-2022-0083225

(51) Int. Cl.
*H04L 12/66*    (2006.01)
*H04L 12/40*    (2006.01)
(Continued)

(52) U.S. Cl.
CPC ........ *H04L 12/40039* (2013.01); *H04L 12/66* (2013.01); *H04L 41/0809* (2013.01); *H04L 69/085* (2022.05)

(58) Field of Classification Search
CPC . H04L 12/40039; H04L 12/66; H04L 12/282; H04L 41/0809; H04L 41/0816;
(Continued)

(56) References Cited

U.S. PATENT DOCUMENTS

| 9,767,249 | B1 * | 9/2017 | Belz ....................... G05B 15/02 |
| 9,921,559 | B2 * | 3/2018 | Tsubota ................ H04L 12/282 |

(Continued)

FOREIGN PATENT DOCUMENTS

| KR | 101584980 | 1/2016 |
| KR | 101754210 | 7/2017 |

(Continued)

OTHER PUBLICATIONS

"Office Action of Korea Counterpart Application", dated Aug. 30, 2022, with English translation thereof, p. 1-p. 12.

*Primary Examiner* — Le H Luu
(74) *Attorney, Agent, or Firm* — JCIPRNET

(57) ABSTRACT

The disclosure relates to a power management system having a gateway engine for automatic mapping and cloud interoperability of ESS facility data and a driving method for the system. The power management system includes an interface unit forming a communication protocol with at least one or more storage devices; and a gateway engine including a data receiving unit receiving registration data from at least one energy storage device through at least one communication protocol included in the interface unit, a data mapping unit identifying an energy storage device based on registration data received by the data receiving unit, and a cloud interoperating unit linking registration data mapped by the data mapping unit to a cloud environment, automatically maps data, applies a control logic, and interoperates with a cloud EMS, thereby reducing man-hours for developing a PMS/EMS, securing profitability, and expanding the small-scale ESS market.

6 Claims, 3 Drawing Sheets

(51) Int. Cl.
*H04L 41/0806* (2022.01)
*H04L 69/085* (2022.01)

(58) Field of Classification Search
CPC ... H04L 69/085; G05B 15/02; G05B 19/0423; G05B 19/41845; G05D 1/0276; G05F 1/66; G06F 16/535; G06F 9/541; G06Q 10/063118; H04W 12/06; H04W 76/14; H04W 88/08
See application file for complete search history.

(56) References Cited

U.S. PATENT DOCUMENTS

| | | | |
|---|---|---|---|
| 2018/0198680 A1* | 7/2018 | Mladin | H04L 41/0816 |
| 2020/0381940 A1* | 12/2020 | Hong | G06F 9/541 |
| 2021/0084712 A1* | 3/2021 | Chen | H04W 88/08 |
| 2021/0243012 A1* | 8/2021 | Chen | G06F 16/535 |
| 2022/0078267 A1* | 3/2022 | Nixon | G05B 19/0423 |
| 2022/0108262 A1* | 4/2022 | Cella | G06Q 10/063118 |
| 2022/0116771 A1* | 4/2022 | Luo | H04W 12/06 |
| 2022/0147579 A1* | 5/2022 | Ricci | G05D 1/0276 |
| 2022/0368761 A1* | 11/2022 | Cella | G05B 19/41845 |
| 2023/0305587 A1* | 9/2023 | Thirumurthy | G05F 1/66 |
| | | | 700/286 |
| 2023/0328815 A1* | 10/2023 | Wiese | H04W 76/14 |
| | | | 370/328 |

FOREIGN PATENT DOCUMENTS

| KR | 102248727 | 5/2021 |
|---|---|---|
| KR | 1020210073836 | 6/2021 |

* cited by examiner

POWER MANAGEMENT SYSTEM HAVING GATEWAY ENGINE AND DRIVING METHOD THEREOF

CROSS-REFERENCE TO RELATED APPLICATION

This application claims the priority benefits of Korean application Ser. No. 10-2022-0083225, filed on Jul. 6, 2022. The entirety of each of the above-mentioned patent applications is hereby incorporated by reference herein and made a part of this specification.

BACKGROUND

Technical Field

The present disclosure relates to a power management system (PMS) and a driving method for the system and, more particularly, to a power management system having a gateway engine for automatic mapping and cloud interoperability of ESS facility data and a driving method for the system.

Related Art

Recently, there has been a global trend towards the implementation of nuclear power phase-out policies, accompanied by a reduction in the reserve ratio of nuclear power generation facilities, where the reduced reserve ratio is supplemented by an expansion of renewable energy sources such as solar, wind, and geothermal power generation. Nuclear power is stable and may be supplied uninterrupted; in contrast, power generated from renewable energy sources wildly fluctuates due to the surrounding environment and natural conditions, which makes a continuous power supply difficult. Moreover, since a time difference between energy production and consumption is inevitable, it is challenging to solve the power shortage problem only by increasing the amount of renewable energy.

To address the problem above, it is necessary to focus on managing power consumption rather than the power supply issues, which leads to a demand management problem of reducing the peak demand power or achieving power load balancing. Currently, Korea has implemented various demand management measures, including the peak-time electricity rate and time-based rate systems to standardize consumers' electricity use patterns.

A demand controller is utilized as a means to manage the peak demand power. The demand controller calculates the power consumption based on the readings from the watt-hour meter and compares the calculated power consumption with a predetermined reference value. Suppose the actual power usage exceeds the reference value. In that case, the demand controller triggers an alarm to disconnect specific loads according to a predetermined priority. Conversely, the demand controller releases the alarm and reactivates the loads according to the predetermined priority if the power usage falls below the reference value.

In this case, a target load should not affect the manufacturing process and quality when the target load is cut off or reconnected. In addition, it is essential that business operations and environmental conditions remain unharmed, and there should be no problems in terms of safety management. Types of loads that may be controlled according to the above constraints are limited to air-conditioning facilities and operating intermittently. Due to these constraints, the demand controller may not fully control the demand power.

An energy storage system (ESS) has recently emerged as an important solution to manage power during peak demand. An ESS stores electrical energy in a battery at a time of low power demand or late at night and uses the stored energy when power demand is high, thereby achieving a stable power supply and managing power demand.

In general, an energy storage system (ESS) refers to a device that stores energy coming from renewable energy sources, such as solar and wind power, in an energy storage device such as a battery and supplies electricity when the electricity demand is high to improve power consumption efficiency. In other words, an ESS stores and manages produced power to selectively and efficiently use energy when needed.

Types of the ESS may include a battery, a power conversion system (PCS) that performs AC-DC conversion and power distribution functions, and a power management system (PMS). A battery management system (BMS) monitors and manages batteries and exchanges necessary information with the PCS and/or the PMS.

Currently, ESSs are composed of a battery (with a BMS), a PCS, and a PMS/EMS. Since various components from different manufacturers or different versions are installed depending on specific sites, system integration (SI) development is required to build a PMS.

As development man-hours increase accordingly, it is necessary to reduce the cost of the PMS/EMS to build a small-scale ESS and generate profits.

SUMMARY

To solve the problem above, the present disclosure provides a power management system having a gateway engine for automatic mapping and cloud interoperability of ESS facility data, which automatically maps data, applies a control logic, and interoperates with a cloud EMS, thereby reducing man-hours for developing a PMS/EMS, securing profitability, and expanding the small-scale ESS market.

To achieve the object above, the present disclosure comprises the following constituting elements.

In other words, a power management system having a gateway engine for automatic mapping of ESS facility data and cloud interoperability according to one embodiment of the present disclosure comprises an interface unit forming a communication protocol with at least one or more storage devices; and a gateway engine comprising a data receiving unit receiving registration data from at least one energy storage device through at least one communication protocol included in the interface unit, a data mapping unit identifying an energy storage device based on registration data received by the data receiving unit and mapping data to the energy storage device, and a cloud interoperating unit linking the registration data mapped by the data mapping unit to a cloud environment.

Also, the power management system further comprises a control logic including an interface checking unit recognizing a communication protocol for an energy storage device identified by the data mapping unit and a mode matching unit matching a communication mode by applying a communication protocol recognized by the interface checking unit to the energy storage device identified by the data mapping unit.

Meanwhile, a driving method for a power management system having a gateway engine for automatic mapping and cloud interoperability of ESS facility data comprises data receiving receiving registration data from at least one energy storage device through at least one communication protocol included in an interface unit forming a communication protocol with at least one or more energy storage devices, data mapping identifying an energy storage device based on registration data received by the data receiving and mapping data to the energy storage device, and cloud interoperating linking registration data mapped by the data mapping to a cloud environment.

The present disclosure provides a power management system having a gateway engine for automatic mapping and cloud interoperability of ESS facility data, which automatically maps data, applies a control logic, and interoperates with a cloud EMS, thereby reducing man-hours for developing a PMS/EMS, securing profitability, and expanding the small-scale ESS market.

DETAILED DESCRIPTION

The technical terms used in the present disclosure have been introduced solely for the purpose of describing a specific embodiment, and it should be noted that the terms are not intended to restrict the technical scope of the present disclosure. Also, unless defined explicitly otherwise, the technical terms used in the present disclosure should be interpreted to have the same meaning as understood generally by those skilled in the art to which the present disclosure belongs but should not be interpreted to have excessively comprehensive or simplified meaning.

In what follows, preferred embodiments of the present disclosure will be described in detail with reference to appended drawings.

Also, the term "unit" or "module" used in the present disclosure may refer to a software component or a hardware component such as a Field Programmable Gate Array (FPGA) or an Application Specific Integrated Circuit (ASIC), and the "unit" or "module" performs at least one function or operation. However, the "unit" or "module" is not necessarily limited to a software or hardware component. The "unit" or "module" may be configured to be implemented in an addressable storage medium or configured to operate one or more processors. Therefore, for example, the "unit" or "module" includes those components such as software components, object-oriented software components, class components, and task components; processes, functions, properties, procedures, subroutines, segments of a program code, drivers, firmware, micro-code, circuits, data, databases, data structures, tables, arrays, and variables. The functions provided by the constituting elements and the "unit" or "module" of the present disclosure may be combined into a smaller number of constituting elements, "units", and "modules" or further divided into additional constituting elements, "units", or "modules".

In the present disclosure, a terminal refers to any kind of hardware device that includes at least one processor; depending on the embodiments, the terminal may be understood as including a software configuration operating in the corresponding hardware device. For example, a user terminal may be understood as including various devices such as a smartphone, a table PC, a desktop PC, a notebook computer, and a user client and application running on each of the devices; however, it should be noted that the present disclosure is not limited to the above specific description.

Figure 1:
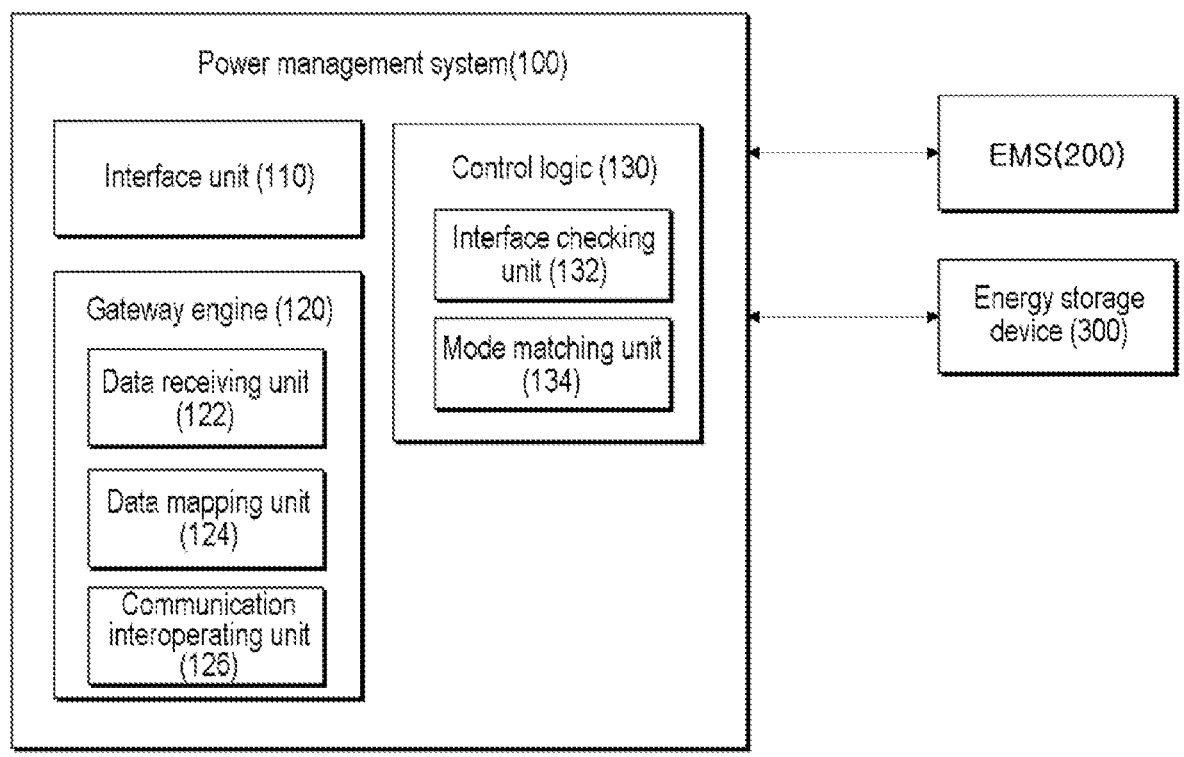
FIG. 1 is a block diagram of a power management system having a gateway engine for automatic mapping and cloud interoperability of ESS facility data according to one embodiment of the present disclosure.

FIG. 1 is a block diagram of a power management system having a gateway engine for automatic mapping and cloud interoperability of ESS facility data according to one embodiment of the present disclosure.

An ESS comprises one or more batteries, a battery management system (BMS), a power conditioning system (PCS), and a power management system (PMS).

The ESS battery is composed of cell, module, and rack units. Multiple cells form a module, and multiple modules are packaged to build one large rack. A module is obtained by assembling cells into one protective frame that shields the cells from external shocks such as heat and vibration. A rack is constructed by packaging the modules and integrating various systems that monitor and manage battery temperature or voltage.

Generally, a rack consists of 500 cells, and one system may be built by connecting multiple racks.

The battery management system (BMS), attached to the top of the module and managing thousands of cells as a single cell, performs a battery control function of monitoring the battery voltage and charging and discharging current and measuring the internal temperature to stop charging and discharging batteries if an abnormal condition is detected.

The power conditioning system (PCS) converts alternating current (AC) into direct current (DC) for charging the battery with generated power; the PCS converts the DC back into AC to discharge the battery and supply the power.

The power management system (PMS) monitors the amount of stored electricity and serves as the overall operating software of the ESS. The PMS manages data, including the amount of generated power, the quantity charged and discharged, and operation history, and monitors and controls the ESS.

The power management system 100 according to one embodiment is distinguished by its ability to automate a significant portion of the development process for the PMS 100 specific to the field requirements, which is conventionally carried out manually by developers.

To this end, the power management system 100 according to one embodiment is characterized by automatic data mapping, application of a control logic, and interoperation with a cloud EMS 200.

As shown in FIG. 1, the power management system 100 according to one embodiment comprises an interface unit 110, a gateway engine 120, and a control logic 130.

The interface unit 110 forms a communication protocol with at least one or more energy storage devices 300.

Figure 2:
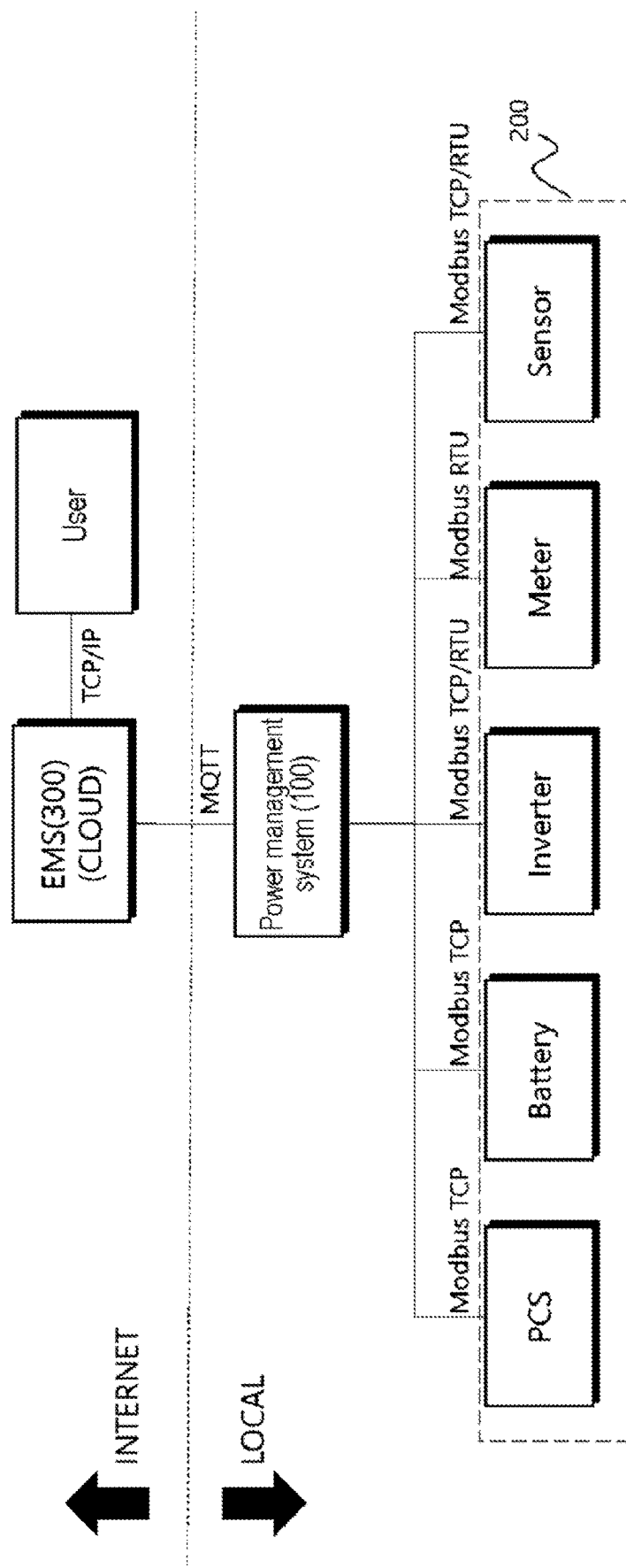
FIG. 2 illustrates a communication protocol supported by a power management system according to one embodiment.

FIG. 2 illustrates a communication protocol supported by a power management system according to one embodiment.

For example, the interface unit 110 may receive data through various types of communication protocols for each energy storage device 300, such as Modbus TCP for the PCS, Modbus TCP for batteries, Modbus TCP/RTU for inverters, Modbus RTU for meters, and Modbus TCP/RTU for sensors.

For example, the Modbus protocols may be largely divided into three types, including the Modbus Serial, the Modbus Plus, and the Modbus TCP/IP.

The Modbus TCP/IP is a Modbus variant using TCP/IP for communications on the Ethernet. Since the TCP/IP is an open standard, the Modbus TCP/IP may be considered the actual open standard for the fieldbus. The Modbus TCP/IP is widely used for managing information exchange, monitoring, and distributed I/O between devices.

The Modbus RTU is a master-slave communication protocol based on the serial communication specifications while the Modbus TCP/IP specifies a protocol for transmission of a wrapped Modbus RTU message over the TCP/IP network instead of the serial line. A server uses an IP address rather than a slave ID.

Compared to the Modbus RTU communication, the Modbus TCP/IP communication assigns 7 bytes of MBAP header to the front of a message. Typical hardware protocols used for the Modbus RTU communication include the RS485 and the RS422.

The interface unit 110 may form an interface based on the MQTT protocol and support cloud interoperation with the EMS 200.

The Message Queuing Telemetry Transport (MQTT) is a publish-subscribe based messaging protocol, which is the ISO standard (ISO/IEC PRF20922) [5]. The MQTT operates on the TCP/IP protocol. The MQTT has been designed for "small code footprint" or connections with remote locations having limited network bandwidth. The publish-subscribe messaging pattern requires a message broker.

MQTT is a TCP-based protocol for the Internet of Things (IoT). The MQTT is designed to be run efficiently even for low-power and low-performance devices. The main entities include a publisher, a broker, and a subscriber.

The MQTT has been designed for small code footprint or connections with remote locations having limited network bandwidth, namely, for limited traffic transmission such as the IoT communication or large-scale traffic transmission. In this respect, the MQTT runs on the TCP/IP protocol, but at the same time, it is lightweight and solves various communication limitations.

The gateway engine 120 comprises a data receiving unit 122, a data mapping unit 124, and a cloud interoperating unit 126.

In one embodiment, the gateway engine 120 may be implemented as a service conversion framework based on SOA web services that support easy integration of services using heterogeneous platforms or communication protocols to build a ubiquitous environment using embedded devices.

The gateway engine 120 may be lightweight and suitable for embedded environments and employ a structure to convert various dynamic protocols into web service formats and provide web services. The gateway engine 120 may be implemented to provide additional services in a distributed manner.

In one embodiment, the gateway engine 120 may express and manage the services provided by the power management system 100 as abstracted services on a framework and upload the services to the cloud for external use. In other words, the gateway engine 120 may upload data from various devices to the cloud, namely, data provided by energy storage devices 300.

In one embodiment, the data receiving unit 122 includes adapters and handlers for connection through various communication protocols. The adapter handles a process related to transmitting and receiving all data transmitted or received in communication with a currently interacting device (energy storage device) or a client. The handler analyzes the data transmitted through the adapter according to the corresponding protocol and prepares for registration in a service container.

The data receiving unit 122 also has a dynamic reconfiguration structure. When the system in which the gateway engine 120 is installed encounters a new standard or protocol, the data receiving unit 122 processes information related to the new standard or protocol and arranges a corresponding handler to prepare the new standard or protocol for use. Through the operation, even if data that may not be processed in the current configuration is received, a new handler may be received to dynamically add a new standard or protocol, regardless of time and place.

Also, the gateway engine 120 may interoperate with the cloud EMS.

Specifically, the data receiving unit 122 receives registration data from at least one energy storage device 300 through at least one communication protocol included in the interface unit 110.

The at least one energy storage device 300 includes a PCS, a battery, an inverter, a meter, and a sensor.

The data receiving unit 122 receives data through various types of communication protocols for each energy storage device 200, such as Modbus TCP for the PCS, Modbus TCP for batteries, Modbus TCP/RTU for inverters, Modbus RTU for meters, and Modbus TCP/RTU for sensors.

The data mapping unit 124 identifies the energy storage device 300 based on the registration data received by the data receiving unit 122 and maps data to the energy storage device 300. The data mapping unit 124 may determine which function data is collected from which type of energy storage device 300.

For example, the battery, one of the energy storage devices 300, uses a micro-board inside the battery cabinet to monitor internal conditions such as temperature and humidity sensors and air conditioners and provides the monitored condition data to the power management system 100.

The data mapping unit 124 may identify the data information collected from various energy storage devices 300.

In one embodiment, the data mapping unit 124 may allocate, store, and manage addresses for individual information collected from at least one or more energy storage devices 300.

For example, the data mapping unit 124 stores and manages mapping records of attribute information and allocated address information for each item from each AI Point/AO Point/DI Point. For example, the data mapping unit 124 may manage AI POINT information representing voltage and current as analog signals; AO POINT providing a control signal for operation, stop, charge, or discharge to the PCS/battery; and DI POINT information representing a signal for a failure of the PV/PCS/battery, including overvoltage, overcurrent, undervoltage, and undercurrent.

The data mapping unit 124 may itemize and manage measurement, status, and output information at the AI Point/AO Point/DI Point and identify the matched energy storage device 300 and target protocol information.

The cloud operating unit 126 links the registration data mapped by the data mapping unit 124 to the cloud environment.

In one aspect, the cloud operating unit 126 performs communication interoperation with the energy management system (EMS) in the cloud environment.

The EMS is a system with the goal of performing an energy flow control for an energy storage device (ESS), which produces various types of renewable energy and stores and uses the produced energy within a battery system so that the ESS may store or consume surplus energy and achieve optimal energy use by collecting/managing information related to the ESS status and the like.

The control logic 130 according to one aspect of the present disclosure includes an interface checking unit 132 and a mode matching unit 134.

The interface checking unit 132 recognizes a communication protocol for an energy storage device identified by the data mapping unit 124.

The interface checking unit 132 determines the type of communication protocol for communication with a connected energy storage device according to the type of the corresponding energy storage device 300.

The mode matching unit 134 matches a communication mode by applying a communication protocol recognized by the interface checking unit 132 to the energy storage device 300 identified by the data mapping unit 124. Accordingly, instead of employing a process in which a developer has to set up the communication mode based on specific task requirements, the mode matching unit 134 may automatically set up the communication mode according to which device is connected in which environment, thereby automating a task portion that has been performed manually.

At this time, the control logic 130 further includes a remote controller that performs remote control of at least one energy storage device 300 through a cloud service.

The remote controller (not shown) may perform necessary control by monitoring the overall energy consumption of the energy storage device 300 and estimating power demand. In other words, the remote controller may perform real-time monitoring of the energy storage devices 300 and control functions according to user requirements by receiving information from the power conditioning system (PCS), battery management system (BMS), and various protection devices (sensors).

For example, the remote controller may determine whether to open or close a circuit breaker connected to the energy storage device 300. Alternatively, the remote controller may perform various operation controls such as peak cut or task scheduling.

In other words, the power management system 100 manages the operations related to the energy storage device 300, such as a generator assigned to the power management system 100. The power management system 100 may operate or stop a generator, open and close a circuit breaker connected to the energy storage device 300, such as the generator, and perform the function of synchronization.

The control logic 130 may perform real-time based operations of the energy storage device 300 and an equipment monitoring function in real-time. The control logic 130 may further include a main information display dashboard to provide an operation history and a download function.

Also, the control logic 130 may perform a notification function by monitoring the operational status of the power management system 100 itself and perform operational status monitoring and notification of any abnormal conditions of at least one or more connected energy storage devices 300.

Figure 3:
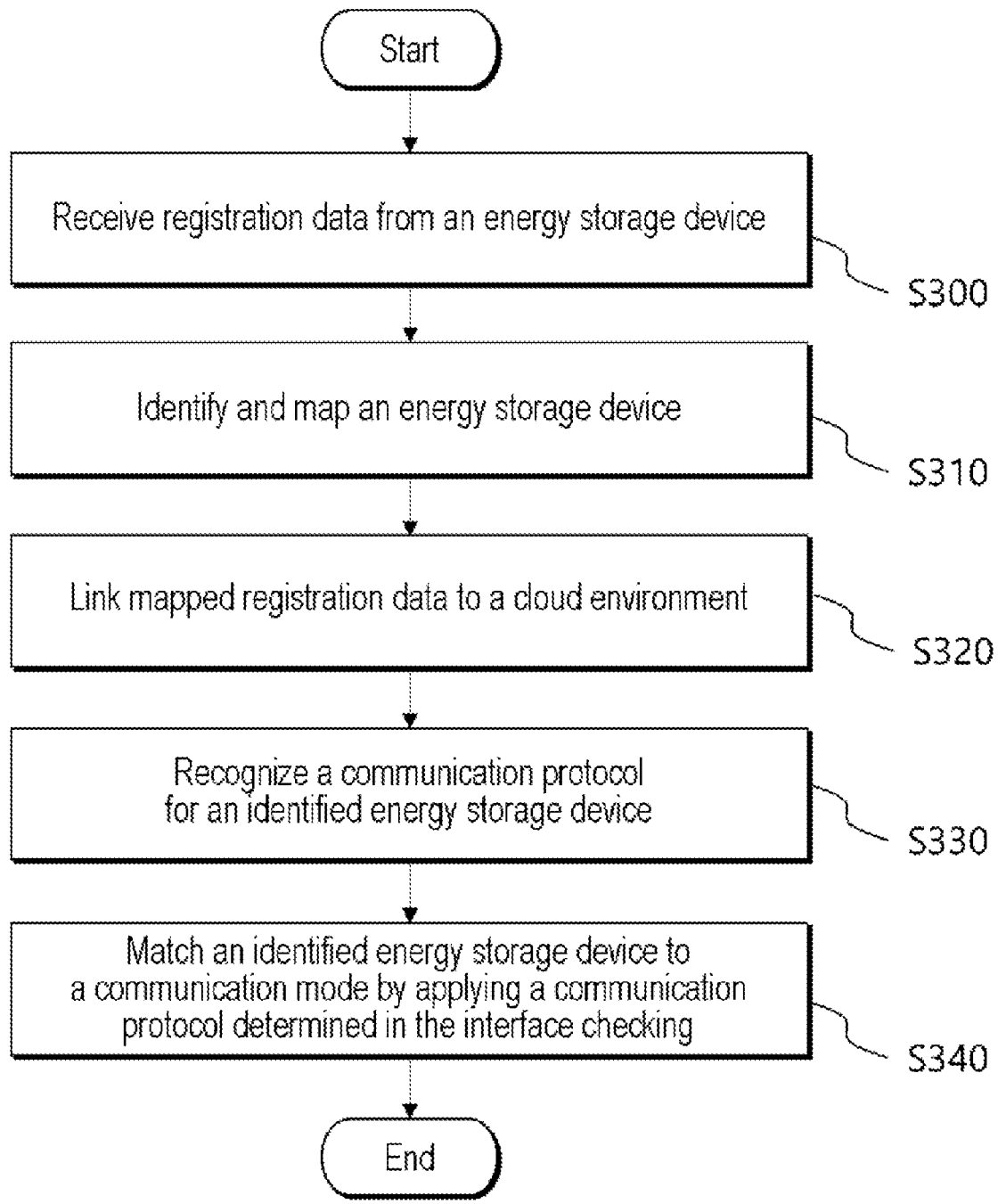
FIG. 3 is a flow diagram illustrating a driving method of a power management system having a gateway engine for automatic mapping and cloud interoperability of ESS facility data according to one embodiment of the present disclosure.

FIG. 3 is a flow diagram illustrating a driving method of a power management system having a gateway engine for automatic mapping and cloud interoperability of ESS facility data according to one embodiment of the present disclosure.

First, registration data is received from at least one energy storage device through at least one communication protocol included in the interface unit forming a communication protocol with at least one or more energy storage devices S300.

For example, the interface unit may receive data through various types of communication protocols for each energy storage device, such as Modbus TCP for the PCS, Modbus TCP for batteries, Modbus TCP/RTU for inverters, Modbus RTU for meters, and Modbus TCP/RTU for sensors.

The interface unit identifies an energy storage device based on the registration data received in the data receiving step and maps data to the energy storage device 310.

In the subsequent data mapping step, the mapped registration data are linked to the cloud environment S320.

The data mapping stores and manages mapping records of attribute information and allocated address information for each item from each AI Point/AO Point/DI Point. For example, the data mapping manages AI POINT information representing voltage and current as analog signals; AO POINT providing a control signal for operation, stop, charge, or discharge to the PCS/battery; and DI POINT information representing a signal for a failure of the PV/PCS/battery, including overvoltage, overcurrent, undervoltage, and undercurrent.

According to one aspect of the present disclosure, the data mapping determines the communication protocol for the identified energy storage device S330.

The data mapping may itemize and manage measurement, status, and output information at the AI Point/AO Point/DI Point and identify the matched energy storage device 300 and target protocol information.

The next step S340 matches a communication mode by applying a communication protocol recognized in the interface checking step to the energy storage device identified in the data mapping step.

The matching step matches a communication mode by applying a communication protocol recognized by the interface checking step to the energy storage device identified by the data mapping step. Accordingly, instead of employing a process in which a developer has to set up the communication mode based on specific task requirements, the mode matching unit 134 may automatically set up the communication mode according to which device is connected in which environment, thereby automating a task portion that has been performed manually.

The methods described above may be implemented in the form of an application or program commands which may be executed through various constituting elements of a computer and recorded in a computer-readable recording medium. The computer-readable recording medium may include program commands, data files, and data structures separately or in combination thereof.

The program commands recorded in the computer-readable recording medium may be those designed and configured specifically for the present disclosure or may be those commonly available for those skilled in the field of computer software.

Examples of a computer-readable recoding medium may include magnetic media such as hard-disks, floppy disks, and magnetic tapes; optical media such as CD-ROMs and DVDs; and hardware devices specially designed to store and execute program commands such as ROM, RAM, and flash memory.

Examples of program commands include not only machine codes such as those generated by a compiler but also high-level language codes which may be executed by a computer through an interpreter and the like. The hardware device may be configured to be operated by one or more software modules to perform the operations of the present disclosure, and vice versa.

Although the present disclosure has been described with reference to the embodiments given above, it should be understood by those skilled in the art that various modifications and variations of the present disclosure may be made without departing from the technical principles and scope specified by the appended claims below.

What is claimed is:

1. A power management system having a gateway engine for automatic mapping and cloud interoperability of energy storage system (ESS) facility data, the power management system comprising:
    an interface unit forming a communication protocol with at least one or more storage devices;
    a gateway engine implemented on a service oriented architecture (SOA) web service-based service conversion framework, the gateway engine comprising a data receiving unit receiving registration data from at least one energy storage device through at least one communication protocol included in the interface unit, a data mapping unit identifying an energy storage device based on registration data received by the data receiving unit to determine which function data is collected from which type of energy storage device and mapping data to the energy storage device, and a cloud interoperating unit linking registration data mapped by the data mapping unit to a cloud environment; and
    a control logic including an interface checking unit recognizing a communication protocol for an energy storage device identified by the data mapping unit and a mode matching unit matching a communication mode by applying a communication protocol recognized by the interface checking unit to an energy storage device identified by the data mapping unit to automatically establish a communication mode according to which device is connected in which environment.

2. The power management system of claim 1, wherein the control logic further includes a remote controller performing remote control of at least one energy storage device through a cloud service.

3. The power management system of claim 2, wherein the interface unit forms a message queuing telemetry transport (MQTT) protocol-based interface.

4. The power management system of claim 3, wherein the cloud interoperating unit performs communication interoperation with an energy management system (EMS) in the cloud environment.

5. The power management system of claim 1, wherein the interface unit further includes interfaces based on a Modbus transmission control protocol (TCP) and a Modbus remote terminal unit (RTU) protocol.

6. A driving method for a power management system having a gateway engine for automatic mapping and cloud interoperability of energy storage system (ESS) facility data, the method comprising:
    receiving registration data, by the data receiving unit, from at least one energy storage device through at least one communication protocol included in an interface unit forming a communication protocol with at least one or more energy storage devices;
    identifying an energy storage device, by the data mapping unit, based on registration data received in the data receiving to determine which function data is collected from which type of energy storage device and mapping data to an energy storage device,
    linking registration data mapped in the data mapping to a cloud environment by the cloud interoperating unit; and
    matching a communication mode by applying a communication protocol recognized in the interface checking to an energy storage device identified in the data mapping by the mode matching unit to automatically establish a communication mode according to which device is connected in which environment,
    wherein the data receiving unit, the data mapping unit, and the cloud interoperating unit are included in a gateway engine implemented on a service oriented architecture (SOA) web service-based service conversion framework.

* * * * *